United States Patent
Xu et al.

(10) Patent No.: US 8,214,096 B2
(45) Date of Patent: Jul. 3, 2012

(54) APPARATUS AND METHOD FOR CONTROLLING AN ACCELERATOR FOR ELECTRIC VEHICLES

(75) Inventors: Yingwu Xu, Shanghai (CN); Xuguang Zhou, Guangdong (CN); Xiaohua Tang, Guangdong (CN); Jian Gong, Shanghai (CN); Nan Liu, Guangdong (CN); Guangming Yang, Guangdong (CN); Ming Yu, Shanghai (CN)

(73) Assignee: BYD Co. Ltd., Shenzhen (CN)

( * ) Notice: Subject to any disclaimer, the term of this patent is extended or adjusted under 35 U.S.C. 154(b) by 439 days.

(21) Appl. No.: 12/518,731

(22) PCT Filed: Dec. 11, 2007

(86) PCT No.: PCT/CN2007/071213
§ 371 (c)(1),
(2), (4) Date: Jun. 11, 2009

(87) PCT Pub. No.: WO2008/071123
PCT Pub. Date: Jun. 19, 2008

(65) Prior Publication Data
US 2010/0082189 A1 Apr. 1, 2010

(30) Foreign Application Priority Data
Dec. 11, 2006 (CN) .......................... 2006 1 0157473

(51) Int. Cl.
*G06F 7/00* (2006.01)
*G06F 17/00* (2006.01)
(52) U.S. Cl. ............... 701/22; 180/65.21; 477/3; 477/7; 477/62; 477/110; 903/914
(58) Field of Classification Search .................... 701/22; 123/319, 347, 349; 903/914; 180/65.21; 477/110
See application file for complete search history.

(56) References Cited

U.S. PATENT DOCUMENTS
5,632,352 A 5/1997 Jeanneret et al.
(Continued)

FOREIGN PATENT DOCUMENTS
CN 1111904 A 11/1995
(Continued)

OTHER PUBLICATIONS

Real time Advisory System for Fuel Economy Improvement in a Hybrid Electric Vehicle; Syed, F.U.; Filev, D.; Hao Ying; Fuzzy Information Processing Society, 2008. NAFIPS 2008. Annual Meeting of the North American; Digital Object Identifier: 10.1109/NAFIPS.2008.4531275; Publication Year: 2008 , pp. 1-6.*

(Continued)

*Primary Examiner* — Cuong H Nguyen
(74) *Attorney, Agent, or Firm* — Brinks Hofer Gilson & Lione

(57) ABSTRACT

The present invention provides an apparatus and method for controlling an accelerator for electric vehicles. The method comprises steps of: acquiring an actual accelerator pedal depth value and a current vehicle speed; determining a maximum output torque of motor under the current vehicle speed based on the current vehicle speed; and controlling the output torque of motor in such a way that the growth rate of the output torque higher than that of the actual accelerator pedal depth value at the beginning and then closed to that of the actual accelerator pedal depth value during the actual accelerator pedal depth value growing. The invention makes the output torque grown rapidly within the shallow range of accelerator pedal depth, while makes the output torque grown closed to that of the accelerator pedal depth within the relative deep range of accelerator pedal depth. Thus during the initial stage of acceleration, the vehicle may rapidly output a bigger torque, with an excellent dynamic response, to improve the driving comfort.

13 Claims, 3 Drawing Sheets

U.S. PATENT DOCUMENTS

| | | | |
|---|---|---|---|
| 5,775,294 A | 7/1998 | Kojima et al. | |
| 6,278,916 B1 * | 8/2001 | Crombez | 701/22 |
| 6,321,144 B1 * | 11/2001 | Crombez | 701/22 |
| 6,505,715 B1 | 1/2003 | Vikman et al. | |
| 6,757,597 B2 * | 6/2004 | Yakes et al. | 701/22 |
| 6,847,189 B2 * | 1/2005 | Frank | 320/104 |
| 6,885,920 B2 * | 4/2005 | Yakes et al. | 701/22 |
| 7,164,977 B2 * | 1/2007 | Yakes et al. | 701/36 |
| 7,254,468 B2 * | 8/2007 | Pillar et al. | 701/22 |
| 7,302,320 B2 * | 11/2007 | Nasr et al. | 701/22 |
| 7,340,330 B2 * | 3/2008 | Okoshi et al. | 701/22 |
| 7,379,797 B2 * | 5/2008 | Nasr et al. | 701/22 |
| 7,698,044 B2 * | 4/2010 | Prakash et al. | 701/82 |
| 7,711,460 B2 * | 5/2010 | Yakes et al. | 701/22 |
| 7,848,857 B2 * | 12/2010 | Nasr et al. | 701/22 |
| 7,921,945 B2 * | 4/2011 | Harris | 180/65.285 |
| 8,028,778 B2 * | 10/2011 | Luo et al. | 180/65.22 |
| 8,091,659 B2 * | 1/2012 | Luo et al. | 180/65.22 |
| 2004/0060751 A1 * | 4/2004 | Frank | 180/65.2 |
| 2005/0088139 A1 * | 4/2005 | Frank | 320/104 |
| 2009/0044996 A1 * | 2/2009 | Frank | 180/65.29 |
| 2009/0157243 A1 * | 6/2009 | Kim | 701/22 |
| 2009/0166113 A1 * | 7/2009 | Luo et al. | 180/65.265 |
| 2009/0166122 A1 * | 7/2009 | Luo et al. | 180/297 |
| 2009/0166123 A1 * | 7/2009 | Luo et al. | 180/383 |
| 2009/0171522 A1 * | 7/2009 | Luo et al. | 701/22 |
| 2009/0171523 A1 * | 7/2009 | Luo et al. | 701/22 |
| 2009/0234524 A1 * | 9/2009 | Kim | 701/22 |

FOREIGN PATENT DOCUMENTS

| | | | |
|---|---|---|---|
| CN | 1772531 A | | 5/2006 |
| CN | 101200170 B | * | 6/2010 |
| EP | 2091773 A1 | * | 8/2009 |
| FR | 2720697 A | | 12/1995 |
| WO | WO 2008071123 A1 | * | 6/2008 |

OTHER PUBLICATIONS

Accelerated motion control of a supercavitating vehicle; Jinghua Wang; Kaiping Yu; Yingjie Wei; Cong Wang; Rui Lv Systems and Control in Aeronautics and Astronautics (ISSCAA), 2010 3rd International Symposium on; Digital Object Identifier: 10.1109/ISSCAA. 2010.5633154; Publication Year: 2010, pp. 1271-1275.*

International Search Report dated Feb. 26, 2008 issued in corresponding application, International Publication No. WO 2008/071123.

* cited by examiner

APPARATUS AND METHOD FOR CONTROLLING AN ACCELERATOR FOR ELECTRIC VEHICLES

CROSS-REFERENCE TO RELATED APPLICATIONS

This application is a national phase application of PCT Application No. PCT/CN2007/071213, filed Dec. 11, 2007, which claims priority from Chinese Patent Application No. 2006-10157473.8, filed Dec. 11, 2006, both contents of which are incorporated herein by reference in their entirety.

FIELD OF INVENTION

This invention relates an apparatus and method for controlling an accelerator for electric vehicles.

BACKGROUND

For a conventional fuel vehicle, the engine is used as the power output source, during stepping on the pedal of the throttle for accelerating, for controlling the rotary speed with controller, thus a bigger torque may be output without the driver deeply stepping on the pedal of the throttle. But the electric vehicle adopts the torque control, at the forward gear position, the motor controller (i.e. the motor control ECU) may calculate the output torque of motor based on the accelerator pedal travel, thus realize the control of vehicle for accelerating.

The relationship between the output torque and the accelerator pedal depth value in a general motor is linear, and the formula for calculating the output torque is T=Tm*Gain, wherein, T is the output torque of the motor, Tm is the maximum output torque of the motor under the current vehicle speed, which is a specified value, and Gain is the depth value of the accelerator pedal with the range of 0-100%. The more deeply the accelerator pedal travels, the higher the value of Gain. According to the formula mentioned above, the performance curve of output torque T and the accelerator pedal depth value Gain is a straight line, when the current vehicle speed V is specified, the variation of the output torque T depends on the variation of the accelerator pedal depth value Gain, that is, during acceleration, if a larger output torque is required, then the driver must depress the accelerator pedal by a greater amount. However, this case may cause the driver fatigue and may adversely affect driving comfort.

SUMMARY OF THE INVENTION

This invention mainly aims to solve the problem mentioned above to provide an apparatus and method for controlling an accelerator for electric vehicle in order to ensure the electric vehicle with an excellent dynamic response to acceleration and improve the driving comfort.

In order to realize the purpose mentioned above, the present invention provides an apparatus for controlling an accelerator for an electric vehicle, comprising: a speed sensor, for detecting a current vehicle speed of the vehicle and outputting a vehicle speed signal to a motor controller; an accelerator pedal depth sensor, for detecting a depth of the pedal travel of accelerator and outputting an accelerator pedal depth signal to the motor controller; and the motor controller, configured to receive the vehicle speed signal and the accelerator pedal depth signal, determine a current vehicle speed V, an actual accelerator pedal depth value Gain and a maximum output torque $T_m$ of the motor under the current vehicle speed V based on the received signal, determine an output torque T for controlling the motor according to a formula $T=T_m*f(Gain)$, and outputting a torque control signal corresponding to the output torque T; wherein, the formula $T=T_m*f(Gain)$ is such a function that lets the growth rate of the output torque T higher than that of the actual accelerator pedal depth value Gain at the beginning and then closed to that of the actual accelerator pedal depth value Gain during the actual accelerator pedal depth value gain growing.

In order to realize the purpose mentioned above, this invention still provides a method for controlling an accelerator accelerating for an electric vehicle, comprising follow steps: step A) acquiring an actual accelerator pedal depth value Gain and a current vehicle speed V; step B) determining a maximum output torque $T_m$ of motor under the current vehicle speed based on the current vehicle speed V; and step D) controlling the output torque T of motor according to a formula $T=T_m*f(Gain)$; wherein the formula $T=T_m*f(Gain)$ in step D) is such a function that lets the growth rate of the output torque T higher than that of the actual accelerator pedal depth value Gain at the beginning and then closed to that of the actual accelerator pedal depth value Gain during the actual accelerator pedal depth value Gain growing.

In the present invention, by constructing an accelerator pedal curve, i.e., the formula $T=T_m*f(Gain)$, the output torque T grows with the growth rate higher than that of the actual accelerator pedal depth value Gain within the relative shallow range of the actual accelerator pedal depth value Gain and then the output torque T grows with the growth rate closed to that of the actual accelerator pedal depth value Gain within the relative deep range of the actual accelerator pedal depth value Gain during the actual accelerator pedal depth value Gain grows detected by the accelerator pedal depth sensor. Thus the driver just steps on the accelerator pedal, i.e., during the initial stage of acceleration, the vehicle may rapidly output a bigger torque, with an excellent dynamic response, to improve the driving comfort.

The other features and advantages of the present invention may be detailed through embodiments and accompanying figures.

DETAILED DESCRIPTION OF THE PREFERRED EMBODIMENTS

The further description of the present invention is as below referred to the accompanying figures.

Figure 1:
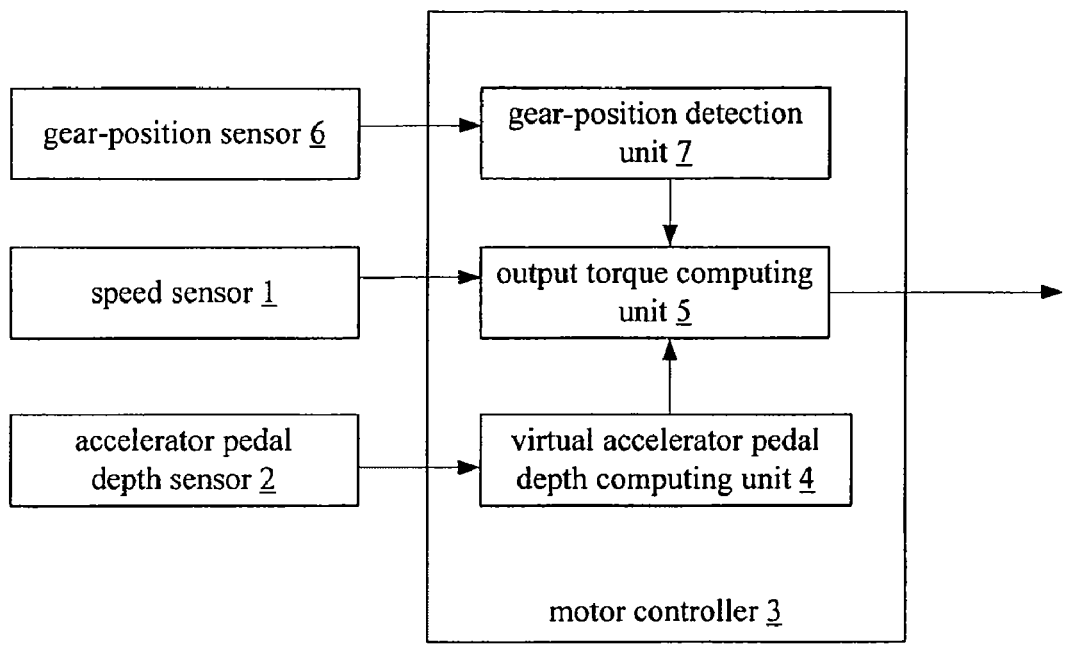
FIG. 1 is a block diagram of an embodiment of the apparatus for controlling an accelerator for electric vehicle according to the present invention.

Refer to FIG. 1, it is a block diagram of an embodiment of the apparatus for controlling an accelerator for electric vehicle according to the present invention, the apparatus comprises: a speed sensor 1, for detecting a current vehicle speed of the vehicle and outputting a vehicle speed signal to a motor controller 3; an accelerator pedal depth sensor 2, for detecting a depth of the pedal travel of the accelerator and outputting an accelerator pedal depth signal to the motor controller 3; and the motor controller 3, configured to receive the vehicle speed signal and the accelerator pedal depth signal, determine a current vehicle speed V, an actual accelerator pedal depth value Gain and a maximum output torque $T_m$, of the motor under the current vehicle speed V based on the received signals, determine an output torque T for controlling the motor according to a formula $T=T_m*f(Gain)$, and outputting a torque control signal corresponding to the output torque T.

Wherein, the speed sensor 1 may be various sensors for measuring speed such as NCS-1D non-contact vehicle speedometer and Hall vehicle speed sensor. The accelerator pedal depth sensor 2 may be various position sensors for detecting the position of accelerator pedal, such as C70FCA-10 pedal controller and HAL815 non-contact electronic accelerator pedal.

Wherein, the formula $T=T_m*f(Gain)$ is such a function that lets the growth rate of the output torque T higher than that of the actual accelerator pedal depth value Gain at the beginning and then closed to that of the actual accelerator pedal depth value Gain during the actual accelerator pedal depth value Gain growing. Thus, at the beginning of acceleration, the bigger output torque may be gained without stepping a deep pedal travel of accelerator.

Preferably, the whole accelerator pedal travel may be divided into three stages with different growth rates of output torque T during the different stages, thus the formula $T=T_m*f(Gain)$ is such a function that lets the growth rate of the output torque T higher than that of the actual accelerator pedal depth value Gain when the actual accelerator pedal depth value Gain is at the initial stage of the whole accelerator pedal travel; lets the growth rate of the output torque T closed to that of the actual accelerator pedal depth value Gain when the actual accelerator pedal depth value Gain is at the middle stage of the whole accelerator pedal travel; and lets the growth rate of the output torque T lower than that of the actual accelerator pedal depth value Gain when the actual accelerator pedal depth value Gain is at the end stage of the whole accelerator pedal travel.

Wherein, said "higher than" the growth rate of the actual accelerator pedal depth value Gain is preferably about 10% more than the growth rate of the actual accelerator pedal depth value Gain; said "closed to" the growth rate of the actual accelerator pedal depth value Gain is preferably about 90%-110% of the growth rate of the actual accelerator pedal depth value Gain; and said "lower than" the growth rate of the actual accelerator pedal depth value Gain is preferably about 10% less than the growth rate of the actual accelerator pedal depth value Gain. All these values such as 10% or 90% are not unique, and they may be defined according to the derivative values of the virtual accelerator pedal curves and that of the actual accelerator pedal depth curves. Furthermore, said "the whole accelerator pedal travel" indicates 0-100% of the accelerator pedal travel, wherein, said initial stage means 0%-30%, said middle stage means 30%-60%, and said end stage means 60%400%. Similar, these values such as 30% or 60% are also not unique, and they may be adjusted according to the percentage of the accelerator pedal travel as necessary.

In particular, shown as FIG. 1, the motor controller 3 comprises a virtual accelerator pedal depth computing unit 4 and an output torque computing unit 5.

Wherein, the virtual accelerator pedal depth computing unit 4 is configured to receive the accelerator pedal depth signal from the accelerator pedal depth sensor 2, obtain the actual accelerator pedal depth value Gain based on the accelerator pedal depth signal, calculate the virtual accelerator pedal depth value Gain' according to the following formula and output the virtual accelerator pedal depth value Gain' to the output torque computing unit 5.

$$\text{Gain}'=f(\text{Gain}) \qquad (1)$$

Figure 2:
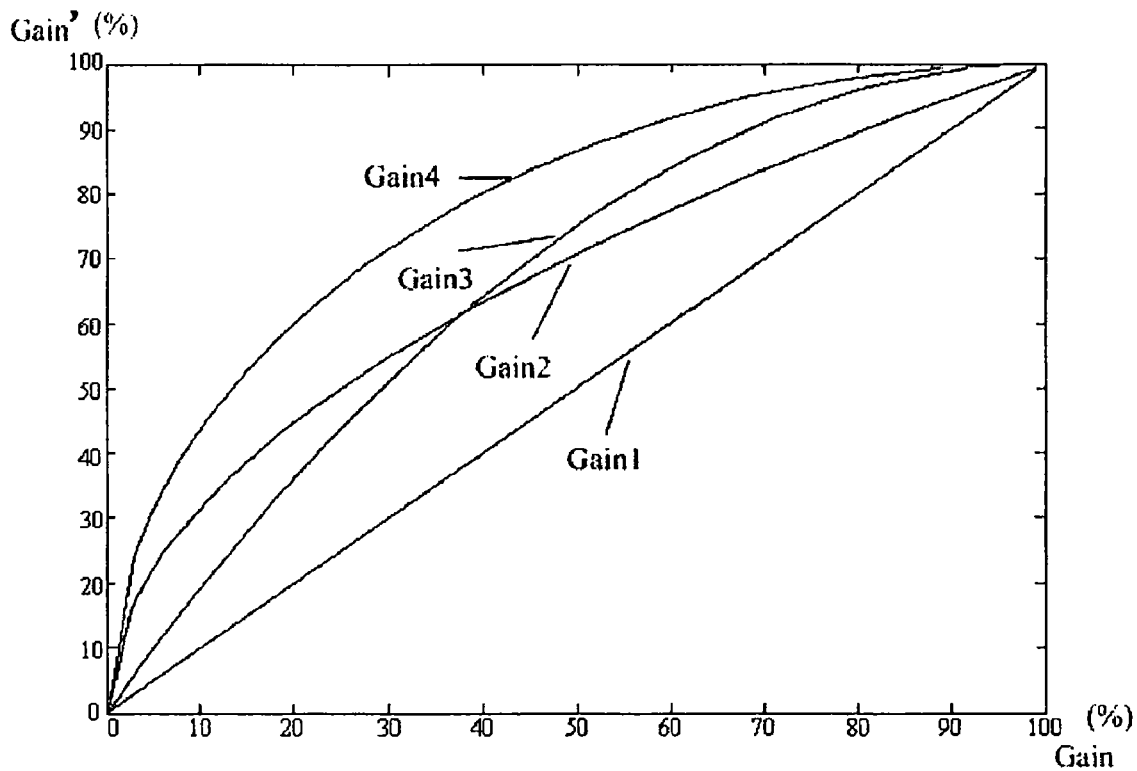
FIG. 2 is a curve chart of the different function relationships Gain'=f(Gain) between the virtual accelerator pedal depth value Gain' and the actual accelerator pedal depth value Gain.

Wherein, the formula (1) Gain'=f(Gain) is such a function that lets the virtual accelerator pedal depth value Gain' varies from 0 to 100% while the actual accelerator pedal depth value Gain varies from 0 to 100%, lets the growth rate of the virtual accelerator pedal depth value Gain' higher than that of the actual accelerator pedal depth value Gain when the actual accelerator pedal depth value Gain is at the initial stage of the whole accelerator pedal travel, lets the growth rate of the virtual accelerator pedal depth value Gain' closed to that of the actual accelerator pedal depth value Gain when the actual accelerator pedal depth value Gain is at the middle stage of the whole accelerator pedal travel, and lets the growth rate of the virtual accelerator pedal depth value Gain' lower than that of the actual accelerator pedal depth value Gain when the actual accelerator pedal depth value Gain is at the end stage of the whole accelerator pedal travel The formula (1) may be several different functions, for example shown as FIG. 2, wherein all the curves Gain2, Gain3, and Gain4 may meet with the requirements mentioned above, and their function expressions are respectively as below:

The function expression of curve Gain2: $\text{Gain}'=\sqrt{\text{Gain}}$

The function expression of curve Gain3: $\text{Gain}'=1-(\text{Gain}-1)^2$

The function expression of curve Gain4: $\text{Gain}'=\sqrt{1-(\text{Gain}-1)^2}$ The function expression of curve Gain1 in FIG. 2 is Gain'=Gain, which specified as reference line in FIG. 2, indicating the case as that mentioned in background technology.

The output torque computing unit 5 is configured to receive the vehicle speed signal and the virtual accelerator pedal depth value Gain', obtain the current vehicle speed V based on the vehicle speed signal, determine the maximum output torque $T_m$ of motor under the current vehicle speed V according to the performance curve of motor corresponding to the current vehicle speed V, calculate the output torque T according to the following formula, and output the torque control signal corresponding to the output torque T $$T=T_m*\text{Gain}' \qquad (2)$$

Figure 3:
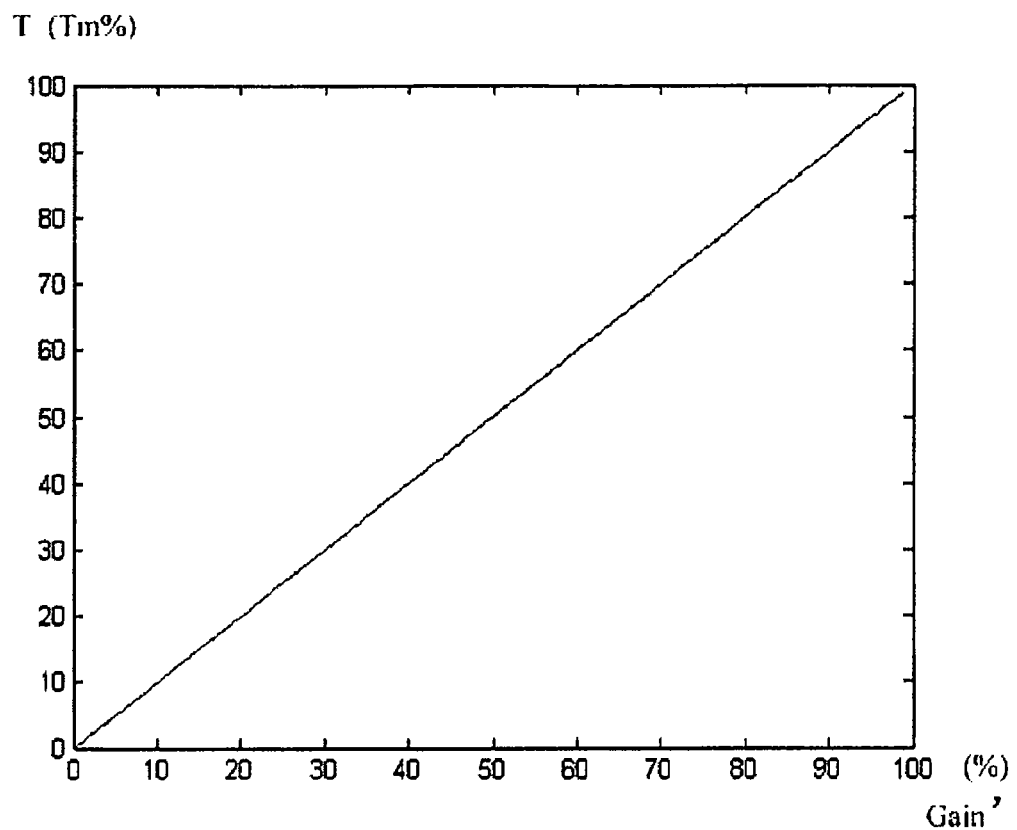
FIG. 3 is a straight line chart of the function relationship $T=T_m*Gain'$ between the output torque T and the virtual accelerator pedal depth value Gain'.

Refer to FIG. 3, the formula (2) is a linear curve with 0 as the initial point, the maximum output torque $T_m$ of motor under the current vehicle speed as the end point, the output torque T as the Y-axis, and the virtual accelerator pedal depth value Gain' as the X-axis. The output torque T shall be increased in linear while the virtual accelerator pedal depth value Gain' increases, thus, when the actual accelerator pedal depth value Gain reaches its maximum value 100%, the virtual accelerator pedal depth value Gain' shall be also reached its maximum value 100%, and the output torque T is up to its maximum value $T_m$.

The maximum output torque $T_m$ of motor under the current vehicle speed may be only determined according to the current vehicle speed V. It is because that the maximum output torque $T_m$ of motor depends on the performance curve of motor. Under different vehicle speeds, the maximum output torques of motor are different, according to the function relationship between the maximum output torque $T_m$ of motor and vehicle speed, under a specified current vehicle speed V, the maximum output torque $T_m$ of motor is also a specified value. The maximum output torque $T_m$ of motor may be measured through experiments.

Incorporating the formula (1) and (2), the formula mentioned above may be obtained $$T=T_m*f(\text{Gain}) \quad (3)$$

Figure 4:
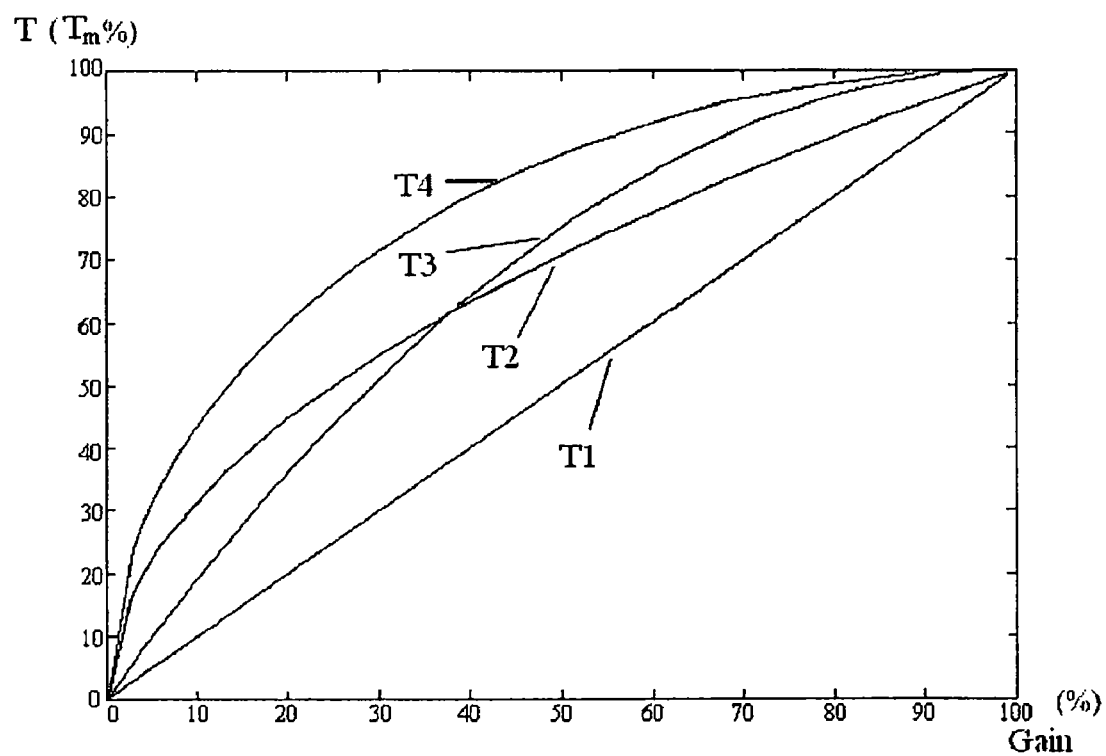
FIG. 4 is a curve chart of the function relationships $T=T_m*f(Gain)$ between the output torque T and the actual accelerator pedal depth value Gain corresponding to FIG. 2.

Then the output torque T is calculated directly, and the middle item, i.e. the virtual accelerator pedal depth value Gain', may be omitted. The curves T2, T3, and T4 in FIG. 4 are respectively the cases of curves Gain2, Gain3, and Gain4 for formula (3), i.e.

The function expression of curve T2: $T=T_m\sqrt{\text{Gain}}$

The function expression of curve T3: $T=T_m[1-(\text{Gain}-1)^2]$

The function expression of curve T4: $T=T_m\sqrt{1-(\text{Gain}-1)^2}$

The function expression of curve T1 in FIG. 4 is $T=T_m*\text{Gain}$, it is specified as the reference line in FIG. 4, indicating the case as that specified in background technology.

During the actual application of the present invention, it still requires to determine whether the vehicle is currently at forward gear, because if the vehicle is now at the reverse gear, with this invention, then slightly step on the accelerator pedal may cause high output torque, the vehicle acceleration too high, which may cause the possible dangers. Thus, the apparatus for controlling an accelerator shown as FIG. 1 still comprises a gear-position sensor 6, for detecting a current gear position and outputting an gear position signal to the motor controller 3; the motor controller 3 further comprises a gear-position detecting unit 7, configured to receive the gear position signal, determine the current gear position based on the gear position signal, and output the determined current gear position to the output torque computing unit 5; moreover, only when the received the current gear position is at forward gear, the output torque computing unit 5 operates. Thus, only when the vehicle is at forward gear, the output torque computing unit 5 works to control the accelerator according to the output torque T; and when the vehicle is at reverse gear, the output torque computing unit 5 is out of work, and no accelerator control is executed for output torque T.

The gear-position sensor 6 may be various types position sensor such as Hall position sensor.

Figure 5:
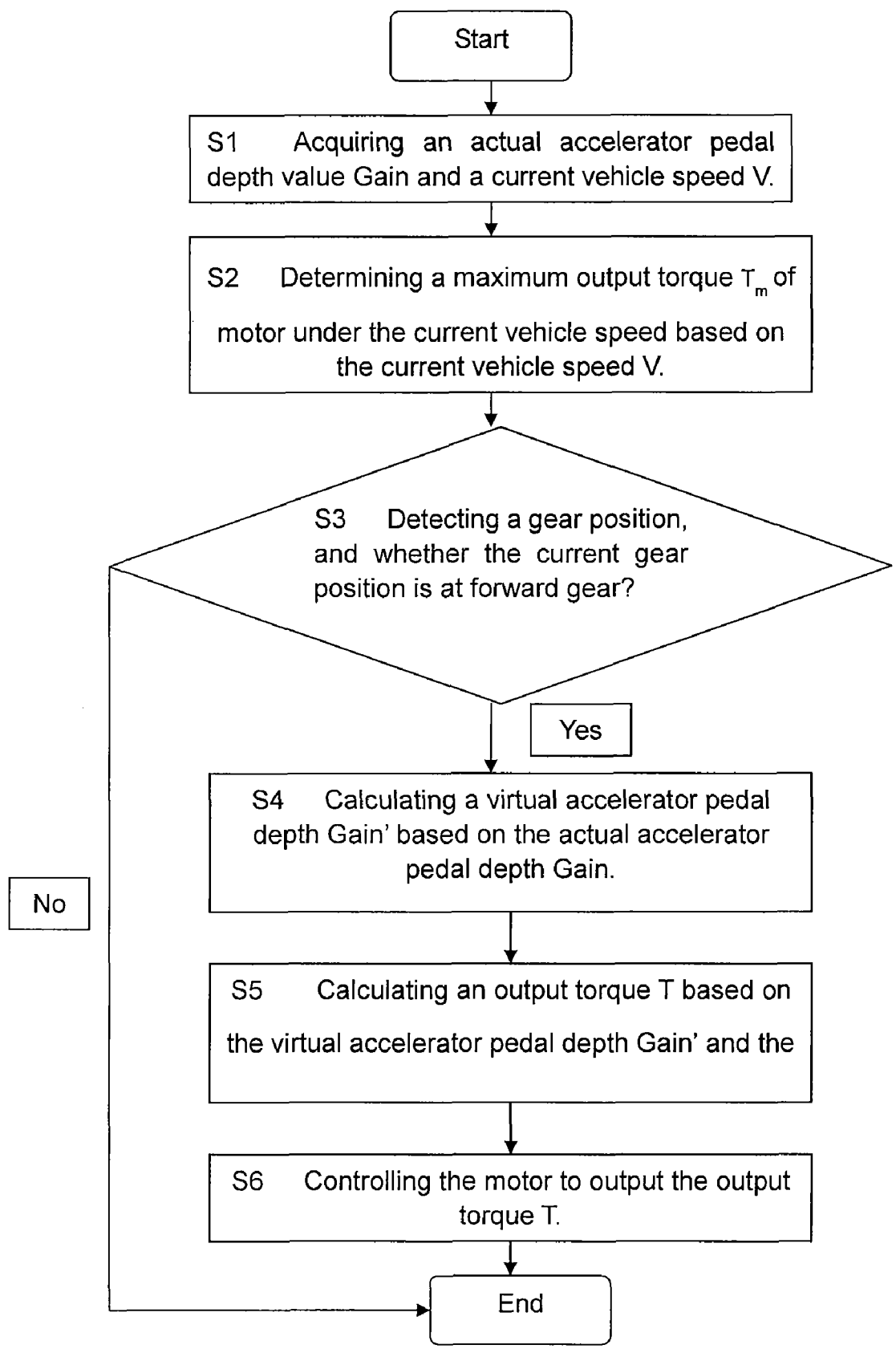
FIG. 5 is a flow chart of the method for controlling an accelerator for electric vehicle according to the present invention.

Shown as FIG. 5, it is a flow chart of the method for controlling an accelerator for electric vehicle according to the present invention. The method comprises the following steps:

In step S1, acquiring an actual accelerator pedal depth value Gain and a current vehicle speed V.

In step S2, determining a maximum output torque $T_m$ of motor under the current vehicle speed based on the current vehicle speed V.

In step S3, calculating a virtual accelerator pedal depth value Gain' according to a formula Gain'=f(Gain).

In step S4, calculating the output torque T according to a formula $T=T_m*\text{Gain}'$.

In step S5, controlling the motor to output the output torque T.

Wherein, in steps S3-S5, the formula $T=T_m*f(\text{Gain})$ may be obtained, this formula is such a function that lets the growth rate of the output torque T higher than that of the actual accelerator pedal depth value Gain at the beginning and then closed to that of the actual accelerator pedal depth value Gain during the actual accelerator pedal depth value Gain growing.

Preferably, the formula $T=T_m*f(\text{Gain})$ is such a function that lets the growth rate of the output torque T higher than that of the actual accelerator pedal depth value Gain when the actual accelerator pedal depth value Gain is at the initial stage of the whole accelerator pedal travel; lets the growth rate of the output torque T closed to that of the actual accelerator pedal depth value Gain when the actual accelerator pedal depth value Gain is at the middle stage of the whole accelerator pedal travel; and lets the growth rate of the output torque T lower than that of the actual accelerator pedal depth value Gain when the actual accelerator pedal depth value Gain is at the end stage of the whole accelerator pedal travel.

Preferably, this method further comprises the following steps: detecting a current gear position in step S3, and continuing executing steps S3-S5 only when the current gear position is at the forward gear detected in step S3. Such embodiment may avoid wrong execution of the method for controlling an accelerator during the vehicle at the reverse gear.

The method provided by the present invention may be executed with the apparatus provide by the present invention, in details, the speed sensor 1 and the accelerator pedal depth sensor 2 are used for executing the step S1, all units of motor controller 3 may execute the steps S2-S5. For step S6, the torque control signal corresponding to the calculated output torque T, that is, PWM signal, is output through motor controller 3 to the drive unit of motor to control the motor. In the electrical system of electric vehicle, the PWM signal is output to the inverter for controlling the motor. The method provided by the present invention may be implemented referring to the detail introduction of the apparatus mentioned above, so the details of the method are omitted here.

For all mentioned above, the invention, for example, by setting a middle item, i.e. the virtual accelerator pedal depth value Gain', an accelerator curve $T=T_m*f(\text{Gain})$ may be reconstructed, during stepping on the accelerator pedal for accelerating, within the shallow range of accelerator pedal depth, the output torque T increases rapidly, within the deep range of accelerator pedal depth, the growth rate of the output torque is closed to that of the actual accelerator pedal depth value. Thus during acceleration, a bigger torque may be output rapidly, which improves the dynamic response and driving comfort of electric vehicle.

We claim:

1. A method for controlling an accelerator for an electric vehicle having a motor, an accelerator pedal depth sensor, and a vehicle speed sensor, the method comprising the steps of:
   a) determining an actual accelerator pedal depth value (Gain) based on output from the accelerator pedal depth sensor, and determining a current vehicle speed (V) based on output from the vehicle speed sensor;
   b) determining a maximum output torque ($T_m$) of the motor based on a current vehicle speed (V);
   c) controlling the output torque (T) of the motor according to a formula $T=T_m*f(\text{Gain})$;
   wherein application of the formula $T=T_m*f(\text{Gain})$ governs the output torque (T) such that:
      during a first period of time, a growth rate of the output torque (T) is greater than a growth rate of the actual accelerator pedal depth value (Gain); and
      wherein during a second period of time, a growth rate of the output torque (T) approximates the growth rate of the actual accelerator pedal depth value (Gain).

2. The method as claimed in claim 1, wherein application of the formula $T=T_m*f(\text{Gain})$ governs the output torque (T) such that during a third period of time, a growth rate of the output torque (T) is lower than a growth rate of the actual accelerator pedal depth value (Gain).

3. The method as claimed in claim 2, wherein:
the first period of time corresponds to an initial stage of the accelerator pedal travel;
the second period of time corresponds to an intermediate stage of the accelerator pedal travel; and
the third period of time corresponds to an end stage of the accelerator pedal travel.

4. The method as claimed in claim 2, wherein the step of controlling and output torque (T) of the motor according to a formula $T=T_m*f(Gain)$ further comprises the steps of:
   a) calculating a virtual accelerator pedal depth value (Gain') according to the formula Gain'=$f$(Gain), wherein application of the formula Gain'=$f$(Gain) governs the output torque (T) such that:
      the virtual accelerator pedal depth value (Gain') varies from 0 to 100% while the actual accelerator pedal depth value (Gain) varies from 0 to 100%;
      the growth rate of the virtual accelerator pedal depth value (Gain') is greater than the growth rate of the actual accelerator pedal depth value (Gain) when the actual accelerator pedal depth value (Gain) corresponds to an initial stage of accelerator pedal travel;
      the growth rate of the virtual accelerator pedal depth value (Gain') approximates the growth rate of the actual accelerator pedal depth value (Gain) when the actual accelerator pedal depth value (Gain) corresponds to a middle stage of accelerator pedal travel; and
      the growth rate of the virtual accelerator pedal depth value (Gain') is less than the growth rate of the actual accelerator pedal depth value (Gain) when the actual accelerator pedal depth value (Gain) corresponds to an end stage of accelerator pedal travel;
   b) calculating the output torque (T) according to the formula $T=T_m*Gain'$; and
   c) controlling the motor to output the output torque (T).

5. The method as claimed in claim 4, wherein the formula Gain'=$f$(Gain) is one of the following functions:

$$Gain'=\sqrt{Gain};$$

$$Gain'=1-(Gain-1)^2; \text{ and}$$

$$Gain'=\sqrt{1-(Gain-1)^2}.$$

6. The method as claimed in claim 1, further including the step of:
detecting a current gear position; and
wherein the step of controlling the output torque (T) of the motor according to a formula $T=T_m*f(Gain)$ is performed only if the detected current gear position indicates a forward gear position.

7. An apparatus for controlling an accelerator for an electric vehicle having a motor, an accelerator pedal, an accelerator pedal depth sensor, and a speed sensor, the apparatus comprising:
a motor controller configured to control the motor;
the speed sensor configured to detect a current vehicle speed of the vehicle and output a vehicle speed signal to the motor controller;
the accelerator pedal depth sensor configured to detect a depth of travel of the accelerator pedal, and output an accelerator pedal depth signal to the motor controller; and wherein the motor controller is configured to:
   receive the vehicle speed signal and the accelerator pedal depth signal;
   determine a current vehicle speed (V) based on the vehicle speed signal;
   determine an actual accelerator pedal depth value (Gain) based on the accelerator pedal depth signal;
   determine a maximum output torque ($T_m$) of the motor based on the current vehicle speed (V);
   calculate an output torque (T) configured to control the motor according to a formula $T=T_m*f(Gain)$;
   output a torque control signal to control the motor corresponding to the calculated output torque (T); and
wherein application of the formula $T=T_m*f(Gain)$ governs the output torque (T) of the motor such that:
   during a first period of time, a growth rate of the output torque (T) is greater than a growth rate of that the actual accelerator pedal depth value (Gain); and
   during a second period of time, the growth rate of the output torque (T) approximates the growth rate of the actual accelerator pedal depth value (Gain).

8. The apparatus as claimed in claim 7, wherein application of the formula $T=T_m*f(Gain)$ governs the output torque (T) such that during a third period of time, the growth rate of the output torque (T) is less than the growth rate of the actual accelerator pedal depth value (Gain).

9. The apparatus as claimed in claim 8, wherein:
the first period of time corresponds to an initial stage of the accelerator pedal travel;
the second period of time corresponds to an intermediate stage of the accelerator pedal travel; and
the third period of time corresponds to an end stage of the accelerator pedal travel.

10. The apparatus as claimed in claim 8, wherein the motor controller comprises:
a virtual accelerator pedal depth computing unit;
the virtual accelerator pedal depth computing unit configured to:
   receive the accelerator pedal depth signal;
   obtain the actual accelerator pedal depth value (Gain) based on the accelerator pedal depth signal;
   calculate a virtual accelerator pedal depth value (Gain') according to the formula Gain'=$f$(Gain); and
   output the virtual accelerator pedal depth value (Gain') to an output torque computing unit;
wherein the virtual accelerator pedal depth value (Gain') varies from 0 to 100% while the actual accelerator pedal depth value (Gain) varies from 0 to 100%;
wherein during a first period of time, a growth rate of the virtual accelerator pedal depth value (Gain') is greater than a growth rate of the actual accelerator pedal depth value (Gain);
wherein during a second period of time, a growth rate of the virtual accelerator pedal depth value (Gain') approximates the growth rate of the actual accelerator pedal depth value (Gain); and
wherein during a third period of time, a growth rate of the virtual accelerator pedal depth value (Gain') is less than a growth rate of the actual accelerator pedal depth value (Gain).

11. The apparatus as claimed in claim 10, wherein the output torque computing unit is configured to:
receive the vehicle speed signal and the virtual accelerator pedal depth value (Gain');
obtain the current vehicle speed (V) based on the vehicle speed signal;

determine the maximum output torque ($T_m$) of a motor under the current vehicle speed (V) according to a performance curve of a motor corresponding to the current vehicle speed (V);

calculate the output torque (T) according to the formula $T=T_m*Gain'$; and output the torque control signal corresponding to the output torque (T).

12. The apparatus as claimed in claim 10, wherein the formula Gain'=$f$(Gain) is selected from one of the following functions:

$$Gain'=\sqrt{Gain};$$

$$Gain'=1-(Gain-1)^2;\text{ and}$$

$$Gain'=\sqrt{1-(Gain-1)^2}.$$

13. The apparatus as claimed in claim 10, further comprising:

a gear-position sensor configured to detect a current gear position and output a gear position signal to the motor controller;

the motor controller further including a gear-position detecting unit configured to receive the gear position signal, determine a current gear position based on the gear position signal, and output the determined current gear position to the output torque computing unit; and wherein the output torque computing unit operates only when the received current gear position corresponds to a forward gear position.

* * * * *